US012403513B2

(12) United States Patent
Safar

(10) Patent No.: US 12,403,513 B2
(45) Date of Patent: Sep. 2, 2025

(54) DISPOSAL SPLASH GUARD FOR DRAIN CLOG REMOVER

(71) Applicant: Samir Hanna Safar, Solana Beach, CA (US)

(72) Inventor: Samir Hanna Safar, Solana Beach, CA (US)

(73) Assignee: Lori Ann Safar, San Diego, CA (US)

( * ) Notice: Subject to any disclaimer, the term of this patent is extended or adjusted under 35 U.S.C. 154(b) by 354 days.

(21) Appl. No.: 18/136,876

(22) Filed: Apr. 20, 2023

(65) Prior Publication Data

US 2024/0351080 A1 Oct. 24, 2024

(51) Int. Cl.

| | |
|---|---|
| ***B08B 13/00*** | (2006.01) |
| ***B08B 1/00*** | (2024.01) |
| ***B08B 1/12*** | (2024.01) |
| ***B08B 1/50*** | (2024.01) |
| ***B08B 9/043*** | (2006.01) |
| ***E03C 1/302*** | (2006.01) |

(52) U.S. Cl.

CPC ................ *B08B 13/00* (2013.01); *B08B 1/12* (2024.01); *B08B 1/50* (2024.01); *B08B 9/0436* (2013.01); *E03C 1/302* (2013.01); *B08B 2209/04* (2013.01)

(58) Field of Classification Search

CPC .. B08B 13/00; B08B 1/12; B08B 1/50; B08B 9/0436; B08B 2209/04; E03C 1/302

See application file for complete search history.

(56) References Cited

U.S. PATENT DOCUMENTS

| | | | | |
|---|---|---|---|---|
| 9,683,356 | B1 * | 6/2017 | Selius | E03C 1/302 |
| 2008/0097351 | A1 * | 4/2008 | Sapia | E03F 9/005 604/267 |
| 2018/0328012 | A1 * | 11/2018 | Corbin | E03C 1/282 |
| 2019/0292759 | A1 * | 9/2019 | Parker | B08B 9/04 |
| 2023/0191463 | A1 * | 6/2023 | Turner | B08B 9/045 15/104.05 |

FOREIGN PATENT DOCUMENTS

| | | | | |
|---|---|---|---|---|
| CA | 3014797 A1 | * 2/2019 | | A46B 15/0055 |
| CN | 108930313 A | * 12/2018 | | E03C 1/2665 |
| JP | 2010527416 A | * 8/2010 | | |

* cited by examiner

*Primary Examiner* — Marc Carlson
(74) *Attorney, Agent, or Firm* — Samir Hanna Safar

(57) ABSTRACT

The present invention relates to a disposal splash guard for drain clog remover wherein the disposal splash guard is a clear, bendable guard that can be placed over the drain during the clog removal process. It is designed to prevent splashes of dirty water and debris from escaping the train and potentially causing unsanitary conditions. The material is both durable and easy to clean, and is able to withstand exposure to water, household chemicals, cleaning agents, and other substances commonly found in stinks and drains. In an embodiment of the present invention, the disposal splash guard has a spiral-storage system attached to the side of the device designed to hold the drain clog remover when it is not in use, keeping it within reach for the next time it is needed ensuring that the drain clog remover is always available and easy to find when it is needed. The spiral storage system also has small brushes, that can be used to clean the clogging instrument as it gets inserted and pulled out of it.

13 Claims, 5 Drawing Sheets

DISPOSAL SPLASH GUARD FOR DRAIN CLOG REMOVER

FIELD OF THE INVENTION

The present invention relates to a disposal splash guard for removing drain clogs that is designed to address the problem of splashing dirt, household chemicals and unhealthy material when using drain clog removers, and more particularly it relates to a transparent, bendable guard that can be placed over the drain during the clog removal process and it also has a spiral storage and cleaning feature for convenient storage when not in use.

BACKGROUND OF THE INVENTION

Drain clogging is a common problem that can occur in any home or commercial building. Clogs can be caused by a variety of materials and substances, and they can occur in any type of drain, from sinks and toilets to showers and bathtubs.

The most common cause of drain clogging is the buildup of material in the drainpipe. This can include hair, soap scum, food particles, grease, and other debris. In the kitchen, cooking oils, fats, and large food particles can easily accumulate and cause a clog. In the bathroom, hair, soap residue, and other hygiene products can accumulate and cause a blockage. Another common cause of drain clogging is the accumulation of mineral deposits, particularly in areas with hard water. These deposits can build up over time and eventually cause a complete blockage. Additionally, tree roots can grow into underground pipes and cause clogging.

Clogged drains can have a number of negative effects. In addition to being an inconvenience, clogs can lead to water damage and sewage backup. This can result in costly repairs and health hazards. Additionally, clogged drains can cause unpleasant odors and attract pests.

There are several preventative measures that can be taken to avoid drain clogging. In the kitchen, avoid pouring grease and large food particles down the drain. Instead, scrape food scraps into the trash and pour grease into a container to be disposed of properly. In the bathroom, use a drain stopper to catch hair and other debris before it enters the drain. Additionally, avoid using too much soap and hygiene products, as these can accumulate and cause a blockage. Regular maintenance is also important in preventing drain clogging. This can include using a plunger or drain-cleaning products to clear minor clogs. For more severe clogs, a professional plumber may need to be called to clear the blockage.

The main problem people face when using drain clog removers is the back-splashing of dirt and unhealthy materials. When a drain clog remover is inserted into a clogged drain and pulled out, the thorns or barbs of the remover can snap and dislodge debris, causing splashes of dirty water, household chemicals and debris to fly out of the drain and potentially onto the user's skin or nearby surfaces. This can create an unsanitary and potentially hazardous situation, especially if the clog contains bacteria or other harmful materials.

In addition to the problem of back-splashing, there are also several health hazards associated with using drain clog removers. Chemical drain cleaners can release harmful fumes that can irritate the eyes, nose, and throat, and can also cause respiratory problems if inhaled. Plungers can cause splash-back, which can lead to contact with unsanitary materials and potentially cause infection or disease. Drain snakes can damage pipes if not used correctly, leading to costly repairs and potentially releasing harmful materials into the environment.

A prior attempt to deal with such problem is utilized in U.S. Pat. No. 4,911,492A discloses an apparatus for a removal of foreign material from sink disposal units: An annular member received in a disposal unit displaces rubber guard members covering the sink opening while establishing an unobstructed central passageway in communication with the grinding hopper of the disposal unit.

U.S. Pat. No. 10,683,648B2 to Beck et al. discloses a drain cleaning apparatus that comprises a handle and a clog-catching member is detachably connected to the handle. The wings, barbs, or hooks projecting radially from the clog-catching member provide an angled projection that catches and holds a clump of debris in a drain pipe for pulling the clump out and unclogging the drain.

Korean Patent No. KR200198681Y1 discloses a disposable sieve that can be used in drain, such as bath tubs, and more particularly, to a disposable sieve and a sieve with a removal strip for easy installation and removal in the drain and a bag for collecting and discarding. A grid shaped obstruction is installed to catch a large solid in a drain, or a simple auxiliary strainer is used on the drain.

United States Patent US20210086240A1 discloses a drain cleaning device for removing debris from a drain. The drain cleaning device includes a handle section; a rod section connected to the handle section, the rod section optionally including one or more ribs, the one or more ribs configured to add structural rigidity to the rod section, and the one or more ribs further configured to facilitate the cleaning of grime from a side of a drain pipe.

United States Patent US20210086240A1 discloses an apparatus for removing clog from a drain. The apparatus consists of an elongated, flexible shaft member with a corkscrew or coil member on one end and an integrated handle at the other end. Inserting the corkscrew end into a dogged drain and manually turning the handle allows the corkscrew portion of the apparatus to worm through the matter that is dogging the drain, and when the apparatus is pulled from the drain the dogging matter is held within the corkscrew member to capture the dogging matter or debris for easy removal.

Unfortunately, till now there are no specific products currently available on the market that address the issue of splashing when using a drain clog remover. While some drain cleaning tools may include a protective shield to prevent splashing, these devices are not specifically designed for this purpose and may not be effective in all situations. This highlights the unique and innovative nature of the disposal splash guard for drain clog remover as disclosed in present invention, which provides a dedicated solution to the problem of splashing and potential health hazards associated with using drain clog removers.

SUMMARY OF THE INVENTION

The present invention discloses a disposal splash guard for drain clog remover that is transparent, bendable and can be placed over the drain during the clog removal process. It is designed to prevent splashes of dirty water and debris from escaping the drain and potentially causing unsanitary conditions. The guard also has a spiral-storage feature, making it convenient to store when not in use.

In an embodiment of the present invention, the disposal splash is designed to make clearing the garbage disposal a cleaner and more efficient process. It is made up of several key components that work together to provide a seamless and hassle-free experience.

In an embodiment of the present invention, the disposal splash guard is made of transparent and flexible material that is both durable. easy to clean, and is able to withstand exposure to water, cleaning agents, and other substances commonly found in sinks and drains. The use of this material ensures that the disposal splash guard will last for a long time, even with regular use.

In an embodiment of the present invention, the base of the disposal splash guard is flat, circular disc that sits on top of the sink or countertop providing stability and support for the device, ensuring that it stays in place during use. The shield of the disposal splash guard is a curved and transparent that fits over the drain. The dome is designed to prevent splashing and accumulation of debris when using a drain clog remover. The transparent body of the disposal splash guard enables user to see if any debris or clogs are present in the train.

In an embodiment of the present invention, the disposal splash guard comprises a spiral storage system attached to the top of the device. The system is designed to hold the drain clog remover when it is not in use, keeping it within the reach for the next time it is needed. This ensures that the drain clog remover is always available and easy to find when it is needed. The disposal splash guard has a clasp at the top of its shield that allows it to be securely closed when not in use. This prevents any debris or water from escaping during use, ensuring that the cleaning process is as clean and hassle free as possible.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE ACCOMPANYING DRAWINGS

The aforesaid as well as other objects and advantages of the invention will appear hereinafter from the following description taken in connection with the accompanying drawings in which.

DETAILED DESCRIPTION OF THE INVENTION

Additional features and advantages of the invention will be outlined in the description which follows, and in part will be obvious from the description, or may be learned by the practice of the invention. These and other features of the present invention will become more fully apparent from the following description or may be learned by the practice of the invention as set forth hereinafter.

With reference now to the drawings, and in particular, from FIG. 1 to FIG. 5 thereof, a disposal splash guard for drain clog remover embodying the principles and concepts of the present invention is described.

Figure 1:
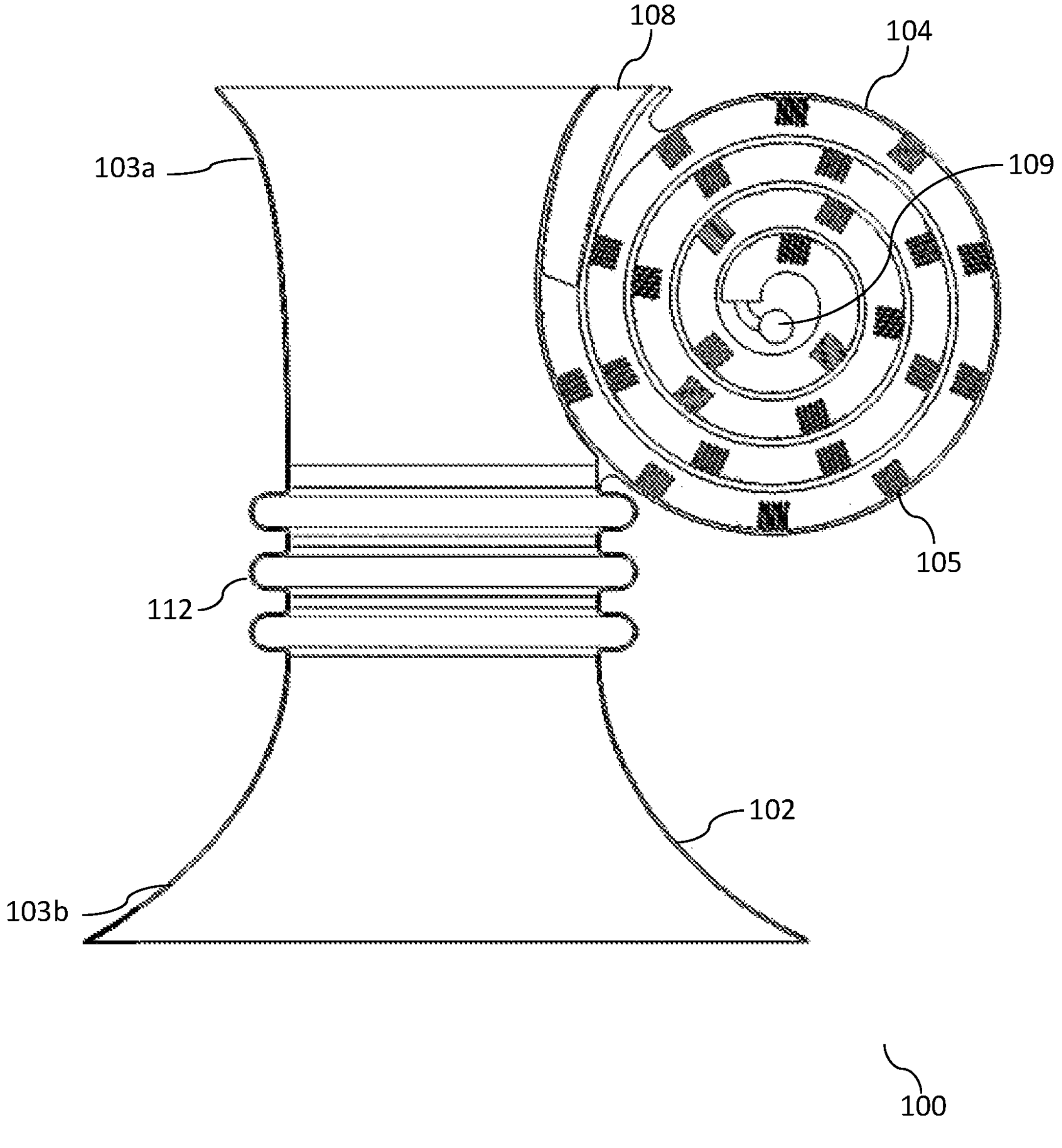
FIG. 1 illustrates an exemplary cross-sectional embodiment of the disposal splash guard.

Referring to FIG. 1, an embodiment 100 of the disposal splash guard for drain clog remover is disclosed wherein the disposal splash guard comprises a shield 102 and a storage system 104. The shield 102 is a clear, bendable guard that can be placed over the drain during the clog removal process. It is designed to prevent splashes of dirty water, debris and household chemicals from escaping the drain and potentially causing unsanitary conditions. The material of the shield is both durable and easy to clean, and is able to withstand exposure to water, cleaning agents, and other substances commonly found in stinks and drains. The use of this material ensures that the disposal splash guard will last for a long time, even with regular use. The shield 102 comprises an upper end 103*a* and a lower end 103*b*. The shield 102 comprises bellow structure 112 such that user can expand it while cleaning and collapse it back when not in use.

The disposal splash guard 100 has a storage system 104 attached to its side provided with an opening 108. The storage system 104, as shown in FIG. 1, is attached near the upper end 103*a* of the disposal splash guard 100 designed to hold the drain clog remover when it is not in use, keeping it within reach for the next time it is needed ensuring that the drain clog remover is always available and easy to find when it is needed. The storage system 104 has mini brushes 105 arranged along the interior of its housing for assisting in cleaning the clog remover (not shown). The storage system 104 has a spiral configuration inside for easy insertion and removal of the clog remover. The storage system 104 also comprises an opening 108 used for inserting the clog remover inside. Further the storage system 104 comprises a drain hole 109 on its center, that acts as a vent for flowing out the excess water from the clog remover when it is inserted in the storage system housing. The opening 108 and drain hole 109 also forms a channel for air to pass through the storage system which facilitates in drying the wet clog remover.

Figure 2:
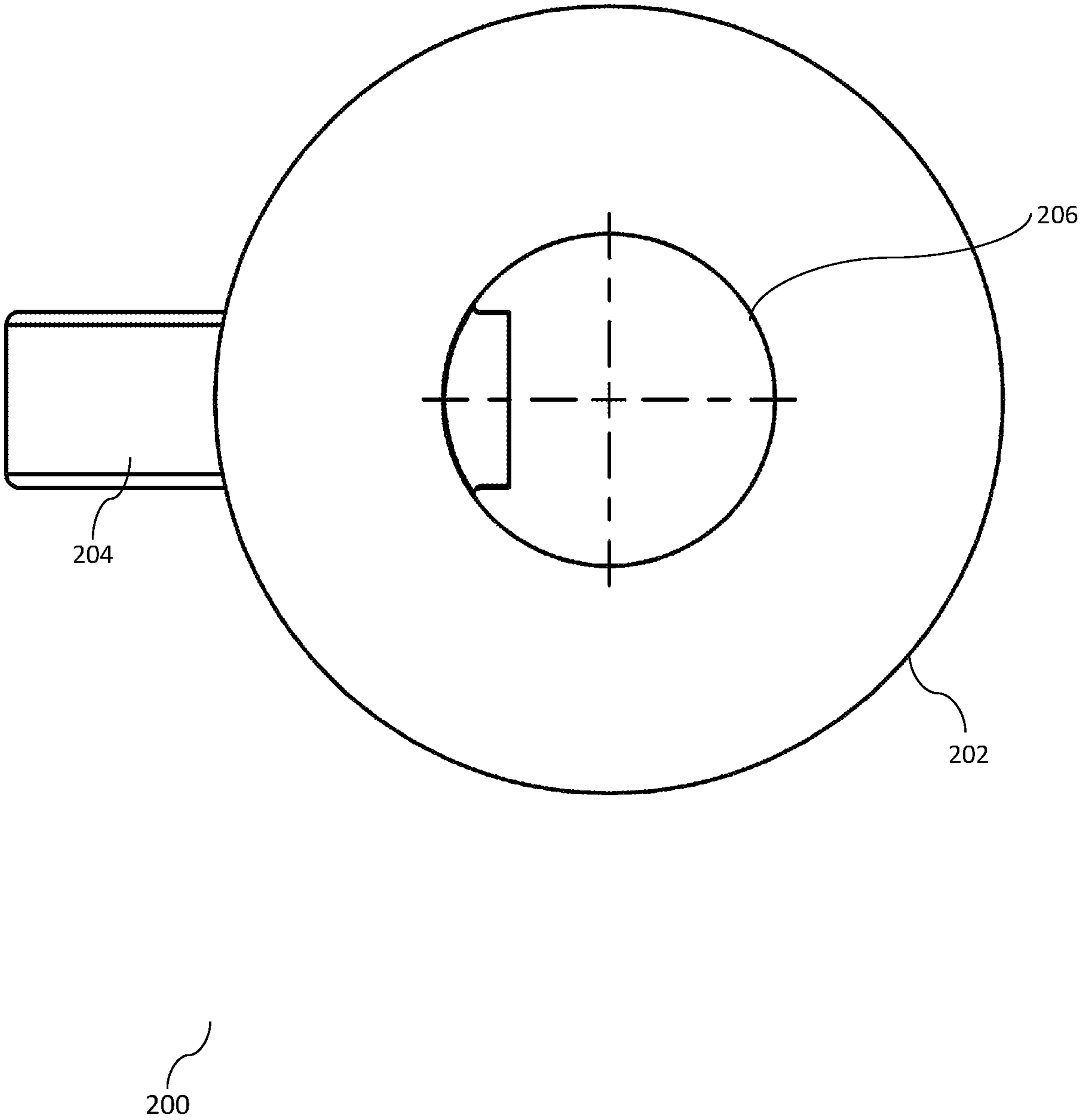
FIG. 2 illustrates an exemplary embodiment of the base of the disposal splash guard.

Referring to FIG. 2, an embodiment 200 of base 202 of the disposal splash guard 200 is disclosed that is a flat, circular disc that sits on top of the sink or countertop. This provides stability and support for the device, ensuring that it stays in place during use. The disc comprises an opening 206 in the center through which the clog remover can enter in the clogged drain. The shield 202 of the disposal splash guard 200 is curved and transparent that fits snugly over the drain to prevent splashing and facilitate accumulation of debris when using a drain clog remover. The transparent body of the shield 202 makes it easy to see if any debris or clogs are present in the drain. The disposal splash guard 200 further comprises a storage system 204 attached on the side of the shield 202 for storing a clog remover.

Figure 3:
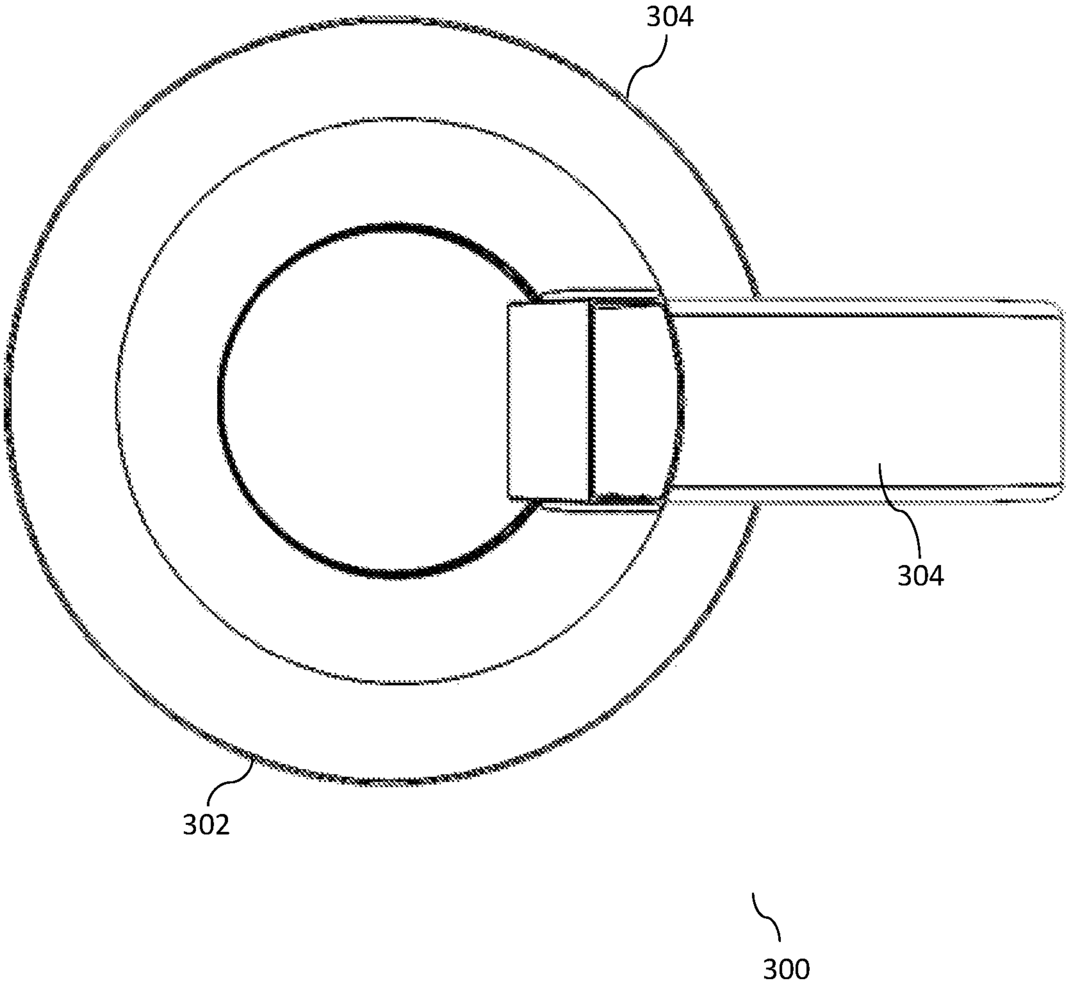
FIG. 3 illustrates an exemplary embodiment of the clasp present at the top of the shield that allows drain clog remover to be securely closed when in use.

Referring to FIG. 3, an embodiment 300 of the disposal splash guard is disclosed comprising a clasp 304 at the top of its shield 302 that allows it to be securely closed when in use. This prevents any debris or water from escaping during use, ensuring that the cleaning process is as clean and hassle-free as possible. The disposal splash guard 300 is a well-designed and innovative product that is sure to make clearing your garbage disposal a much easier and more efficient process. Its durable construction, transparent shield, spiral-storage system, and clasp make it an excellent addition to any kitchen.

Figure 4:
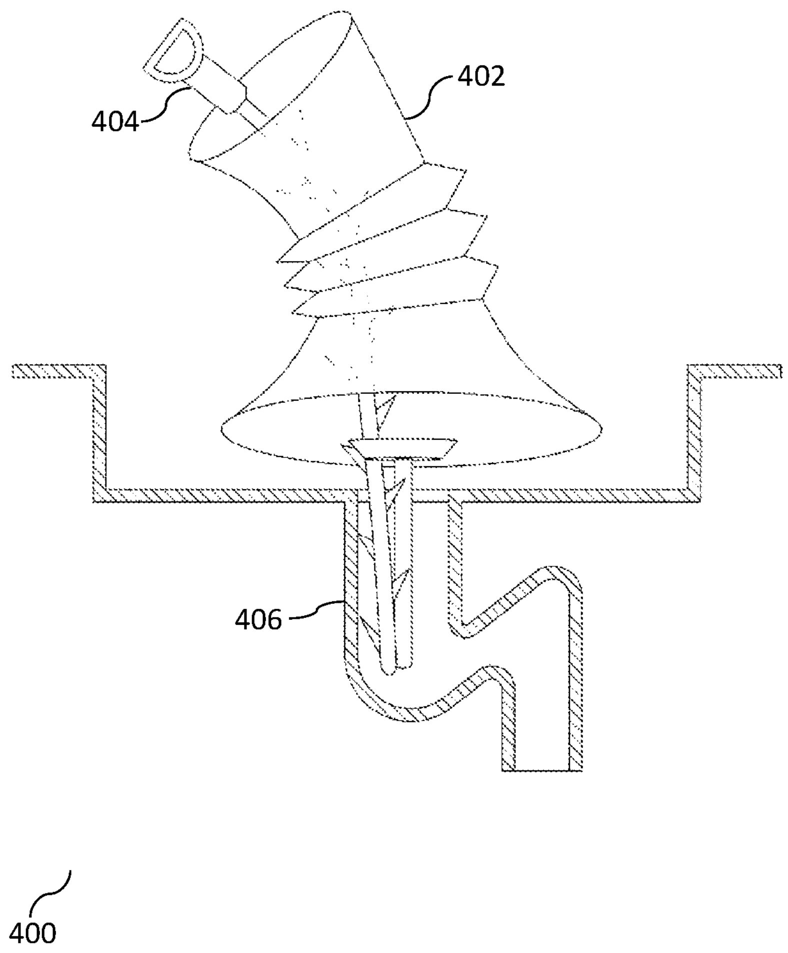
FIG. 4 illustrates an exemplary embodiment of the drain clog remover inserted through the top of the disposal splash guard into the drain.

Referring to FIG. 4, an embodiment 400 of the disposal splash guard is disclosed wherein the disposal splash guard for drain clog removing works by placing the disposal splash guard 402 over the drain and ensuring that it is securely in place. Once it is securely placed drain the clog remover 404 has to be inserted through the top of the disposal splash guard entering into the drain 406. Now use the clog remover 404 to break up and remove the clog and while doing this the disposal splash guard 402 will prevent dirt, debris, and other materials from splashing out of the drain. Now move the clog remover 404 up and down within the disposal splash guard 402 to ensure that any remaining debris is captured inside. After that carefully remove the disposal splash guard 402 from the drain, while holding hold it upright to prevent any debris from spilling out of the disposal splash guard 402. Once the clog has been removed, lift the clog remover 404 out of the drain and place it on the spiral-storage system 406 (not shown) attached to the disposal splash guard 402. Now close the upper mouth of the disposal splash guard 402, with clasp (not shown) to prevent any debris from falling out and empty the accumulated debris from the disposal splash guard 402 into a trash bin or other appropriate disposal method. Finally, the user can rinse the disposal splash guard 402 with water to remove any remaining debris and stored for future use.

Figure 5:
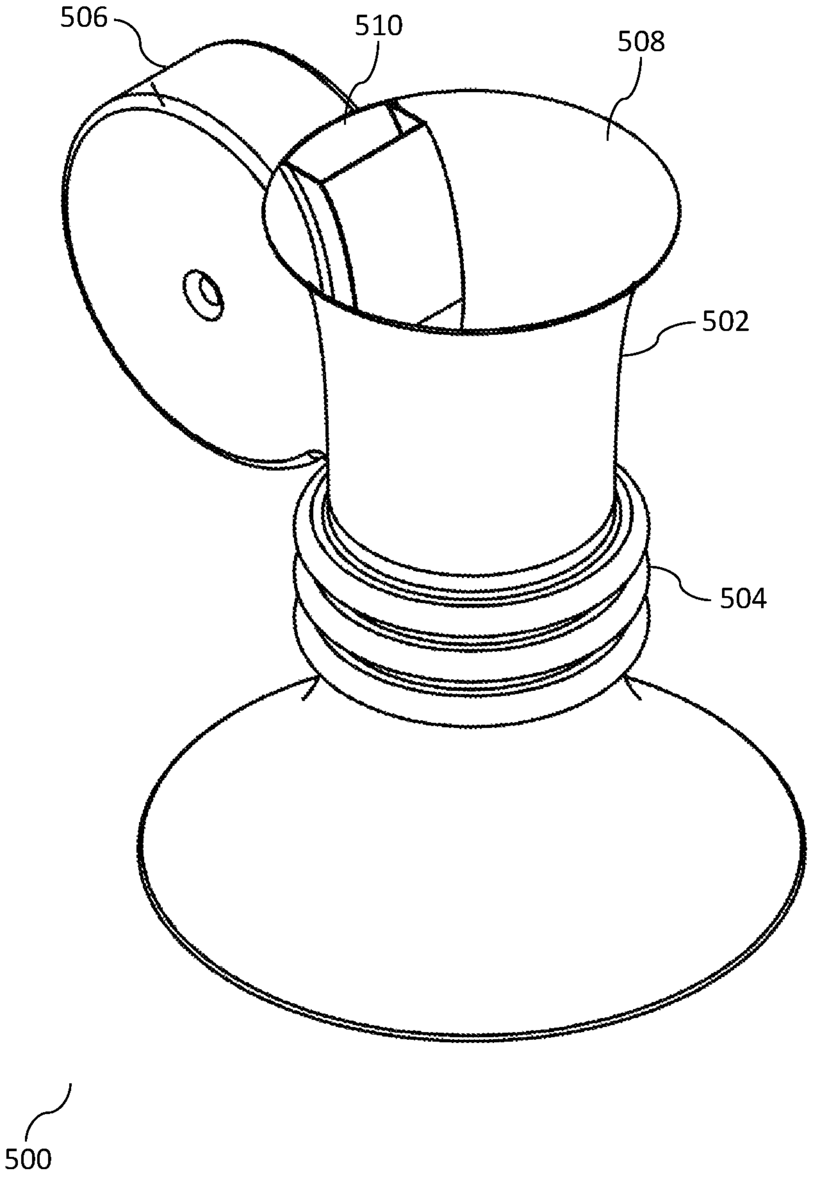
FIG. 5 illustrates an exemplary embodiment of the disposal splash guard.

Referring to FIG. 5, an embodiment 500 of the disposal splash guard is disclosed wherein the disposal splash guard 500 comprises clear, transparent shield 502 that is used to be positioned over an opening of the drain. A spiral storage system 506 attached to the side of the shield 502. The system is designed to hold the drain clog remover when it is not in use, keeping it within the reach for the next time it is needed. This ensures that the drain clog remover is always available and easy to find when it is needed. The disposal splash guard 506 has a clasp 508 at the top of its shield that allows it to be securely closed when not in use. This prevents any debris or water from escaping during use, ensuring that the cleaning process is as clean and hassle free as possible. The disposal splash guard has a collapsible structure 504 in between the body to expand when in use and collapse when not in use. The disposal splash guard has an opening 510 for spiral unit to be inserted into for cleaning the drain.

There are several benefits of using the disposal splash guard for drain clog remover including but not limited to:—improved sanitation because the guard prevents the spread of unsanitary materials and reduces the risk of infection or diseases, reduces clean-up by preventing splashing, the guard reduces the need for clean-up after using drain clog removers, increased safety by reducing the risk of contact with harmful materials since the guard increases safety for users, cost-effective because the guard can be reused multiple times thus reducing the need for disposal solutions and saving money in the long run, and the disposal splash guard is also designed to be bendable and flexible, allowing it to easily fit over a variety of drain sizes and shapes therefore the device can be easily adjusted to fit snugly on the drain ensuring that it stays in place during use.

The disposal splash guard for Drain clog Remover is a unique and innovative solution to the problem of splashing and potential health hazards associated with using drain clog removers. By providing improved sanitation, reduced clean-up, increased safety, and cost-effectiveness, it has the potential to appeal to a wide range of customers in the global drain cleaning equipment market. Through rigorous development and manufacturing processes, effective marketing and sales strategies, and ongoing quality control measures, the disposal splash guard for Drain clog Remover can become a successful product that addresses a common and persistent problem for homeowners, renters, landlords, and professional tradespeople.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclosed herein suitably may be practiced in the absence of any element which is not specifically disclosed herein—and in particular, embodiment specifically contemplated, is intended to be practiced in the absence of any element which is not specifically disclosed herein.

The invention claimed is:

1. A disposal splash guard for a drain clog remover, comprising:
- a flexible shield, comprising an open upper end and an open lower end, designed to prevent splashing and facilitate accumulation of debris from a drain during a drain clog removal process,
- a storage unit comprising a housing attached to the outside surface of the upper end of the flexible shield, wherein:
  - the storage unit comprises a spiral-shaped passage with an opening for insertion and storage of a drain clog remover, and
- the storage unit comprises brushes installed inside the spiral-shaped passage for cleaning the drain clog remover.

2. The disposal splash guard of claim 1, wherein the flexible shield comprises bellow structures in between the upper and lower ends for facilitating bending of the disposable splash guard.

3. The disposal splash guard of claim 1, wherein the flexible shield is transparent allowing for visibility of the drain during use.

4. The disposal splash guard of claim 1, wherein the flexible shield comprises a flat, circular base at the lower end that provides stability and support for the disposal splash on top of a sink or countertop.

5. The disposal splash guard of claim 4, wherein the flat, circular base has a non-slip surface to prevent slipping or sliding during use.

6. The disposal splash guard of claim 1, wherein the storage unit is configured to hold the drain clog remover in a spiral pattern.

7. The disposal splash guard of claim 1, wherein the storage unit comprises a lid on a side of the housing that can be opened for cleaning the storage unit.

8. The disposal splash guard of claim 1, wherein the storage unit comprises a drain hole for removing water from the storage unit.

9. The disposal splash guard of claim 8, wherein, the opening and the drain hole form a channel for passing of air to keep the interior of the storage unit dry.

10. The disposal splash guard of claim 1, wherein the brushes are arranged in multiple locations along the spiral-shaped passage that clean the drain clog remover during insertion and removal.

11. The disposal splash guard of claim 1, wherein the disposal splash guard comprises a clasp at the upper end of the flexible shield that allows for quick and easy closure and opening of the upper end during use.

12. The disposal splash guard of claim 1, wherein the flexible shield is curved and transparent, providing full coverage of the drain and allowing for easy detection of any debris or clogs in the drain.

13. The disposal splash guard of claim 1, wherein the disposal splash guard is disposable, allowing for easy clean-up after use.

* * * * *